United States Patent
Choo et al.

(10) Patent No.: US 6,914,641 B2
(45) Date of Patent: Jul. 5, 2005

(54) LIQUID CRYSTAL DISPLAY DEVICES AND MANUFACTURING METHOD THEREOF

(75) Inventors: Kyo Seop Choo, Gumi-si (KR); Do Sung Kim, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/309,885

(22) Filed: Dec. 5, 2002

(65) Prior Publication Data

US 2003/0107687 A1 Jun. 12, 2003

(30) Foreign Application Priority Data

Dec. 6, 2001 (KR) .................... 10-2001-0076846

(51) Int. Cl.[7] .......................................... G02F 1/1343
(52) U.S. Cl. ...................... 349/38; 349/39; 349/129; 349/138
(58) Field of Search ................... 349/38, 39, 42, 349/43, 129, 141, 138; 257/59, 72

(56) References Cited

U.S. PATENT DOCUMENTS

| | | | |
|---|---|---|---|
| 4,691,995 A | | 9/1987 | Yamazaki et al. |
| 5,309,264 A | | 5/1994 | Lien et al. |
| 5,608,556 A | | 3/1997 | Koma |
| 5,631,753 A | * | 5/1997 | Hamaguchi et al. ........ 349/110 |
| 5,666,179 A | | 9/1997 | Koma |
| 6,081,315 A | * | 6/2000 | Matsuyama et al. ........ 349/143 |
| 6,100,953 A | * | 8/2000 | Kim et al. ................... 349/129 |
| 6,115,088 A | * | 9/2000 | Zhang et al. ................. 349/39 |
| 6,124,604 A | * | 9/2000 | Koyama et al. .............. 257/72 |
| 6,307,214 B1 | * | 10/2001 | Ohtani et al. ................. 257/59 |
| 6,421,102 B2 | * | 7/2002 | Nakayama et al. ........... 349/39 |
| 6,650,390 B2 | * | 11/2003 | Sakamoto et al. .......... 349/143 |

FOREIGN PATENT DOCUMENTS

| | | |
|---|---|---|
| EP | 0884626 | 12/1998 |
| JP | 6-235925 | 8/1994 |
| JP | 8101395 | 4/1996 |
| JP | 9061829 | 3/1997 |
| JP | 10177178 | 6/1998 |
| JP | 10333157 | 12/1998 |
| JP | 10333159 | 12/1998 |
| JP | 11133438 | 5/1999 |
| JP | 11142864 | 5/1999 |
| JP | 11248930 | 9/1999 |
| JP | 11326922 | 11/1999 |
| WO | WO00/08521 | 2/2000 |

OTHER PUBLICATIONS

Y. Tanaka, et al., 16.5L: Late News Paper: A New Design to Improve Performance and Simplify the Manufacturing Process of High–Quality MVA TFT–LCD Panels, ISSN0099–0966X/99/3001–0180–$1.00+.00 © 1999 SID, pp. 206–209.

* cited by examiner

*Primary Examiner*—Robert H. Kim
*Assistant Examiner*—Michael H. Caley
(74) *Attorney, Agent, or Firm*—McKenna Long & Aldridge LLP

(57) ABSTRACT

The LCD device of the present invention provides multi domains without an additional rubbing process to align the liquid crystals in different alignment directions. The LCD device includes a common electrode having slit patterns so as to form a fringe field between the common electrode and the pixel electrode. Auxiliary electrodes are formed on the organic passivation layer to intensify the fringe field and overlap the data lines. The pixel electrode overlaps the auxiliary electrodes. Additionally, the black matrix pattern is formed in the position corresponding to the slit pattern. An additional inorganic layer is formed between the organic passivation layer and the thin film transistors.

32 Claims, 14 Drawing Sheets

LIQUID CRYSTAL DISPLAY DEVICES AND MANUFACTURING METHOD THEREOF

This application claims the benefit of Korean Patent Application No. 2001-76846, filed on Dec. 6, 2001, which is hereby incorporated by reference as if fully set forth herein.

BACKGROUND OF THE INVENTION

1. Field of the Invention

The present invention relates to a liquid crystal display device, and more particularly to a liquid crystal display device increasing an aperture ratio thereof.

2. Discussion of Related Art

A liquid crystal display (LCD) device has first and second substrates and liquid crystals interposed between the first and second substrates. The LCD device also has first and second electrodes in the first and second substrates, respectively, to apply an electric field to the liquid crystals. The LCD device uses optical anisotropy and the polarization properties of liquid crystal molecules to produce images. Liquid crystal molecules have a definite alignment direction as a result of their long, thin shapes. This alignment direction can be controlled by the applied electric field. In other words, as an applied electric field changes, so does the alignment of the liquid crystal molecules. Due to optical the anisotropy, the refraction of incident light depends on the alignment orientation of the liquid crystal molecules. Thus, by properly controlling the applied electric field by the first and second electrodes, a desired image can be produced.

While various types of liquid crystal display devices are known, active matrix LCDs having thin film transistors and pixel electrodes arranged in a matrix are probably the most common. This is because these active matrix LCDs can produce high quality images at a reasonable cost.

As widely known, the LCD device has pixel electrodes in a lower substrate and a common electrode in an upper substrate. When electric signals are applied to the pixel electrodes and the common electrode, the electric fields generated are perpendicular to the lower and upper substrates. These electric fields control the arrangement of the liquid crystals to display images. However, the LCD device does not emit any light such that an additional light source is needed. Therefore, the LCD device includes a rear backlight device as its light source. The backlight device consumes approximately 60% of electric power supplied to the LCD device. In order to increase the luminance of the LCD device, the brightness of the backlight is commonly increased. However, increasing the brightness of the backlight increases the power consumption. Thus, the aperture ratio of the LCD device must be improved to increase the luminance of LCD device without increasing the power consumption.

To improve the aperture ratio in the LCD device, the size of the black matrix in the LCD device should be reduced. The black matrix size is generally defined by considering an alignment margin when attaching the lower and upper substrates and the prevention of light leakage caused by the liquid crystal molecules over data and gate lines. Therefore, the black matrix is positioned to cover the peripheral portions of the pixel electrodes.

Today, LCD devices employ benzocyclobutene (BCB) as an insulator because BCB has a low dielectric constant and improves the aperture ratio. A related art LCD device having BCB as an insulator will be explained with reference to FIGS. 1 to 4.

FIG. 1 is a partial plan view illustrating an array substrate of a related art LCD device.

FIG. 2 is a partial plan view illustrating a color filter substrate of the related art LCD device.

Referring to the array substrate of the related art LCD device in FIG. 1, gate lines 11 are formed in a horizontal direction and a gate electrode 12 extends from each gate line 11. Data lines 14 are then formed in a longitudinal direction. The data lines 14 cross the gate lines 11 so as to define a pixel region P. A source electrode 15 extends from each data line 14, and a drain electrode 16 is positioned opposite to the source electrode 15 across the gate electrode 12. The source and drain electrodes 15 and 16 overlap opposite ends of the gate electrode 12. A semiconductor layer 13 including an active layer of intrinsic semiconductor and an ohmic contact layer of extrinsic semiconductor is positioned over the gate electrode 12 and between the source electrode 15 and the drain electrode 16. Therefore, a thin film transistor T includes the gate electrode 12, the semiconductor layer 13 and the source and drain electrodes 15 and 16.

Still referring to FIG. 1, a pixel electrode 18 including a transparent conductive material is formed in the pixel region P. A portion of the pixel electrode 18 overlaps a portion of the drain electrode 16 and a contact hole 17 is formed in an overlapping area of the drain and pixel electrodes 16 and 18. The pixel electrode 18 contacts the drain electrode 16 through the contact hole 17. Both left and right peripheral side portions of the pixel electrode 18 overlap the data lines 14, respectively.

Referring to the color filter substrate of the related art LCD device in FIG. 2, a black matrix 21 has an opening 21a that corresponds to the pixel electrode 18 of the array substrate. Each of the red, green and blue color filters 22a, 22b and 22c is formed on the black matrix 21 and in the opening 21a. Each color filter 22a, 22b and 22c corresponds to the pixel region P of the array substrate. Although not shown in FIG. 2, the color filter substrate includes a common electrode over all the color filters 22a, 22b and 22c. The common electrode is formed of a transparent conductive material.

FIG. 3 is a cross-sectional view taken along line III—III of FIGS. 1 and 2, and illustrates both the array substrate and the color filter substrate according to the related art.

Referring to FIG. 3, a gate insulation layer 32 is formed on a first substrate 31, and data lines 33 spaced apart from each other are formed on the gate insulation layer 32. A passivation layer 34 is formed on the gate insulation layer 32 while covering the data lines 33. The passivation layer 34 is made of an organic material, for example, benzocyclobutene (BCB), which has a low dielectric constant. On the passivation layer 34, pixel electrodes 35 that are made of a transparent conductive material are formed. Both the right and left side portions of each pixel electrode 35 overlap portions of the data lines 33. Although the pixel electrode 35 partially overlaps the data lines 33, signal interference between the pixel electrode 35 and the data line 33 does not occur because the passivation layer 34 has a low dielectric constant.

Still referring to FIG. 3, a second substrate 41 is positioned over the first substrate 31 and faces the pixel electrodes 35. On the rear surface of the second substrate 41, a black matrix 42 is formed. As described with reference to FIG. 2, the black matrix 42 has openings therein each corresponding to each pixel electrode 35. The black matrix 42 covers the peripheries of the pixel electrode 35 in order to prevent light leakage in regions except the pixel electrode regions. The width of the black matrix 42 covering the peripheries of the pixel electrode can be approximately the same as the width "a" that the pixel electrode 35 overlaps the data line 33. Red, green and blue color filters 43a, 43b and 43c are also formed, alternately, on the rear surface of the second substrate 41. The color filters 43a, 43b and 43c cover portions of the black matrix 42, and each of the color filters 43a, 43b and 43c corresponds to each pixel electrode 35. An overcoat layer 44 covers the color filters 43a, 43b and 43c to protect the color filters 43a, 43b and 43c from possible damages. The overcoat layer 44 also acts to planarize the rear surface of the color filter substrate. A common electrode 45 of a transparent conductive material is formed on the rear surface of the overcoat layer 44. A liquid crystal layer 50 is interposed between the first substrate 31 and the second substrate 41.

In the above-mentioned LCD device, since benzocyclobutene (BCB) has a low dielectric constant and is used for the passivation layer, signal interference is prevented between the pixel electrode and the data line although some of the pixel electrode and the drain electrode overlap each other.

However, the above-mentioned LCD device has a viewing angle problem. Namely, the LCD device having above-mentioned configuration and structure does not have a good viewing angle. Thus, various methods to overcome this disadvantage have been researched and presented. For example, a multi-domain LCD device is presented.

FIG. 4 is a cross-sectional view of an LCD device that adopts a multi-domain technology according to another related art.

Referring to FIG. 4, a gate insulation layer 62 is formed on a first substrate 61, and data lines 63 are formed on the gate insulation layer 62. A passivation layer 64 is formed on the gate insulation layer 62 to cover the data lines 63. For example, the passivation layer 64 is benzocyclobutene (BCB). On the passivation layer 64, pixel electrodes 65 are formed that are for example, a transparent conductive material. Auxiliary electrodes 66a and 66b are also formed on the passivation layer 64. The auxiliary electrodes 66a and 66b are spaced apart from each other and also spaced apart from the pixel electrodes 65. Although not illustrated in FIG. 4, the auxiliary electrodes 66a and 66b actually surround each pixel electrode 65 when viewed in superficial observation. The auxiliary electrodes 66a and 66b overlap the data lines 63 by a width "b", respectively, but there is no signal interference between the data line 63 and the auxiliary electrodes 66a and 66b.

Still referring to FIG. 4, a second substrate 71 is right above the first substrate 61. On the rear surface of the second substrate 71, a black matrix 72 is formed. The black matrix 72 has openings each corresponding to the pixel electrode 65. Thus, the black matrix 72 covers the auxiliary electrodes 66a and 66b and the peripheries of the pixel electrode. Color filters 73a, 73b and 73c that are red, green and blue are then formed on the rear surface of the second substrate 71, alternately. The red, green and blue color filters 73a, 73b and 73c fill in the openings of the black matrix 72 and cover portions of the black matrix 72. An overcoat layer 74 covers the color filters 73a, 73b and 73c to protect the color filters and to planarize the surface of the color filter substrate. A common electrode 75 is formed on the rear surface of the color filter layers 73a, 73b and 73c. The common electrode 75 is a transparent conductive material. Additionally, the common electrode 75 has a slit pattern 75a in a position corresponding to the pixel electrode 65. A liquid crystal layer 80 is interposed into an interval between the first substrate 61 and the second substrate 71.

The LCD device described in FIG. 4 has a slit pattern 75a in the common electrode 75 unlike the LCD device shown in FIG. 3. When voltage is applied to the pixel electrode 65 and the common electrode 75, a fringe field is produced between the pixel electrode 65 and the common electrode 75 because the common electrode 75 has the slit pattern 75a. The liquid crystals are arranged in two different directions with respect to the slit pattern 75a. Because of the different alignment directions of the liquid crystals, multi domains in which the liquid crystal molecules have different alignments can be obtained although a rubbing process is not conducted more than twice.

In the fringe-field multi-domain LCD device shown in FIG. 4, the auxiliary electrodes 66a and 66b act to strengthen the fringe field. Since the auxiliary electrodes 66a and 66b are formed in the same plane as the pixel electrodes 65, the distance "c" between each of the auxiliary electrodes 66a and 66b and the pixel electrode 65 should be greater than or equal to 4 micrometers ($\mu$m) in order to prevent a short between the pixel electrode 65 and each of the auxiliary electrodes 66a and 66b. Additionally, in order to prevent the short between the auxiliary electrodes 66a and 66b, there should be a distance "d" between the two auxiliary electrodes 66a and 66b which is greater than or equal to 4 micrometers ($\mu$m). The width "e" of the auxiliary electrodes 66a and 66b is approximately 5 micrometers ($\mu$m). Therefore, in the fringe-field multi-domain LCD device shown in FIG. 4, the pixel electrode 65 is smaller than the pixel electrode 35 shown in FIG. 3, thereby decreasing the aperture ratio. Moreover, the black matrix covers the peripheries of the pixel electrode 65 by a width "f". Considering the alignment margin when attaching the color filter substrate to the array substrate, the overlapping width "f" is defined to be approximately 5 micrometers ($\mu$m). Thus, the aperture ratio is further decreased in the LCD device shown in FIG. 4. Namely, the fringe-field multi-domain LCD device of FIG. 4 improves the viewing angle, but decreases the aperture ratio.

SUMMARY OF THE INVENTION

Accordingly, the present invention is directed to an LCD device that substantially obviates one or more of the problems due to limitations and disadvantages of the related art.

An advantage of the present invention is to provide a LCD device having a high aperture ratio with an improved viewing angle.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve the above-mentioned advantages, an embodiment of the present invention provides an LCD device that includes first and second substrates that are spaced apart from each other; gate lines arranged in a first direction over the first substrate and data lines arranged in a second direction over the first substrate, the data lines crossing the gate lines to define pixel region; thin film transistors each positioned near a crossing of the gate and data lines, the thin film transitors connected to the gate and data lines; a gate insulation layer over the first substrate and over the gate lines; a first passivation layer formed over the gate and data lines and over the thin film transistors; a second passivation layer over the auxiliary electrodes; pixel electrodes over the second passivation layer, each pixel electrode formed in the pixel region; auxiliary electrodes between the first passivation layer and the second passivation layer, the auxiliary electrodes surrounding each pixel electrode; a black matrix formed underneath the second substrate and positioned right above the gate and data lines and the thin film transistors, the black matrix having openings each corresponding to each pixel electrode; color filters formed underneath the second substrate, each color filter filling into the opening of the black matrix and corresponding to the pixel region; a common electrode formed underneath the color filters, the common electrode having slit patterns each corresponding to the opening of the black matrix; and a liquid crystal layer between the common electrod and the pixel electrodes.

The LCD device further includes an overcoat layer between the common electrode and the color filters. The auxiliary electrodes may be an opaque conductive material, for example, aluminum or aluminum alloy. The first passivation layer may be an organic material, for example, benzocyclobutene or photo acryl. The gate insulation layer and the second passivation layer are inorganic materials selected from a group consisting of silicon nitride and silicon oxide. The slit patterns may have an "I"-shape from a superficial observation, which is parallel with the data lines, or may have a slash shape from a superficial observation, which stretches from left top to right bottom. Alternatively, the slit patterns having a slash shape can stretch from right top to left bottom from a superficial observation.

The LCD device further includes black matrix patterns on the rear surface of the second substrate, wherein each black matrix pattern corresponds in position to each slit pattern and has the same shape and size as the slit pattern. The LCD device having black matrix patterns further includes an additional inorganic layer between the first passivation layer and the thin film transistors, wherein the additional inorganic layer is selected from a group consisting of silicon nitride and silicon oxide. The auxiliary electrodes overlap portions of the data lines. The pixel electrode overlaps portions of the auxiliary electrodes and constitutes a storage capacitor together with the auxiliary electrodes.

In another aspect, an embodiment in accordance with the principles of the present invention provides a method of forming a LCD device. The method includes forming a gate insulation layer over a first substrate; forming data lines over the gate insulation layer; forming thin film transistors over the first substrate; forming a first passivation layer over the gate insulation layer and over the thin film transistors so as to cover the data lines; forming auxiliary electrodes over the first passivation layer so as to overlap portions of the data lines; forming a second passivtion layer over the auxiliary electrodes; forming pixel electrodes over the second passivation layer; forming a black matrix over a second substrate, the black matrix having opeings; forming color filters over the second substrate and on the black matrix, the color filters filling into the openings of the black matrix; forming a common electrode over the color filters, the common electrode having slit patterns each corresponding to the opening of the black matrix; attaching the second substrate having the common electrode to the first substrate having the pixel electrodes so as to allow the common electrode to face the pixel electrodes; and interposing liquid crystals between the common electrode and the pixel electrodes; wherein the auxiliary electrodes surrounds the pixel electrode; wherein the black marrix is positioned right above the gate and data lines and the thin film transistors; wherein each opening of the black matrix corresponds to each pixel electrode; and wherein each color filter corresponds to each pixel electrode.

The method further includes forming gate lines on the first substrate before forming the gate insulation layer; and forming a overcoat layer between the common electrode and the color filters.

The method further includes forming black matrix patterns on the second substrate simultaneous with forming the black matrix, wherein each black matrix pattern corresponds in position to each slit pattern and has the same shape and size as the slit pattern.

The method further includes forming an additional inorganic layer between the first passivation layer and the thin film transistors, wherein the additional inorganic layer is made of a material selected from a group consisting of silicon nitride and silicon oxide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or similar parts.

Figure 1:
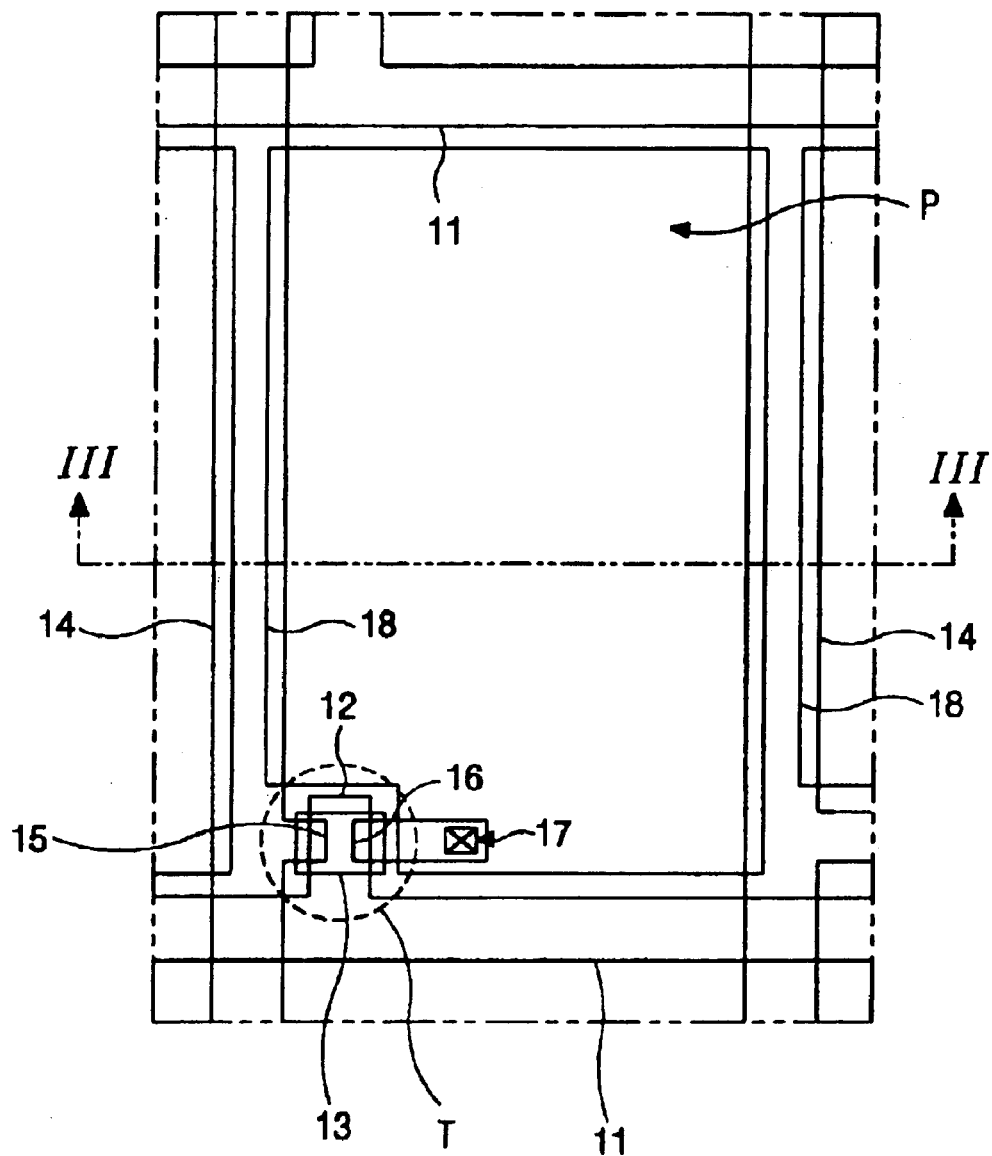
FIG. 1 is a partial plan view illustrating an array substrate of a related art LCD device.
Figure 2:
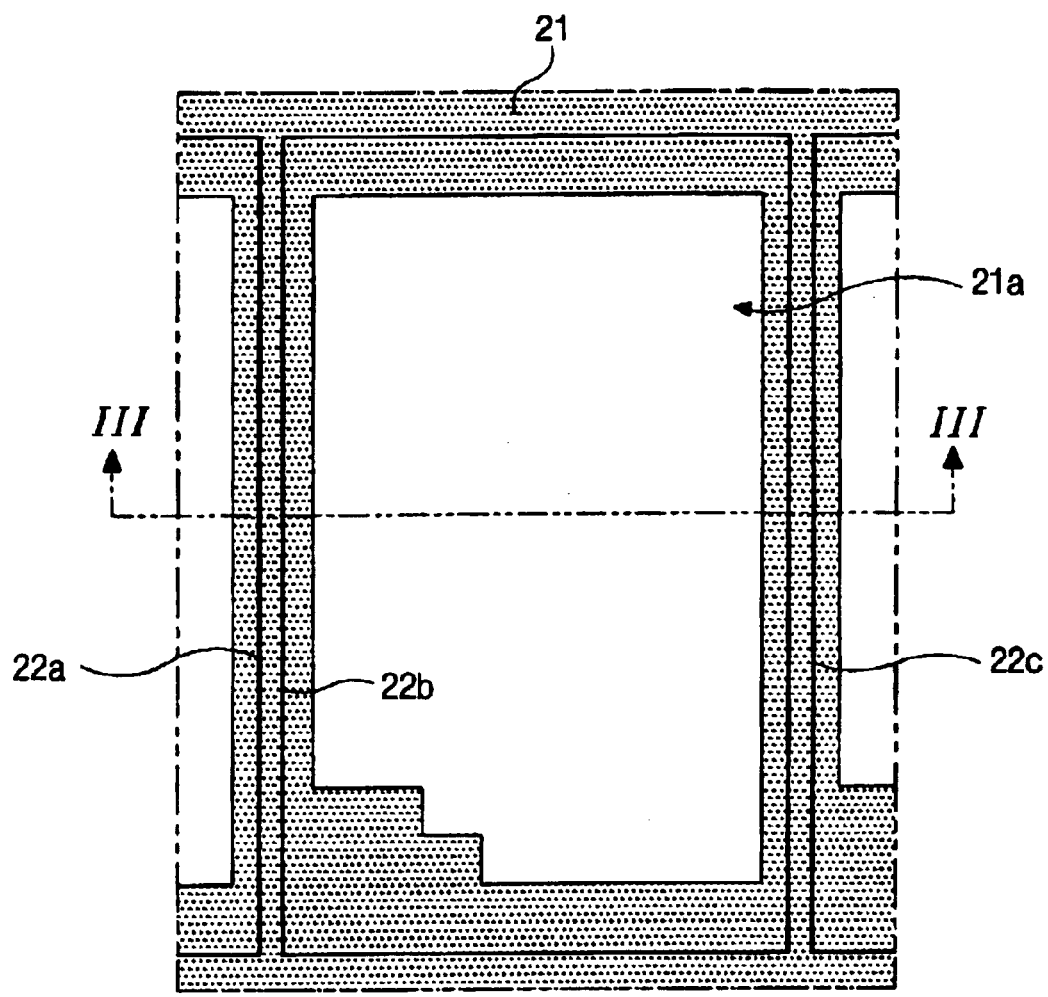
FIG. 2 is a partial plan view illustrating a color filter substrate of the related art LCD device.
Figure 3:
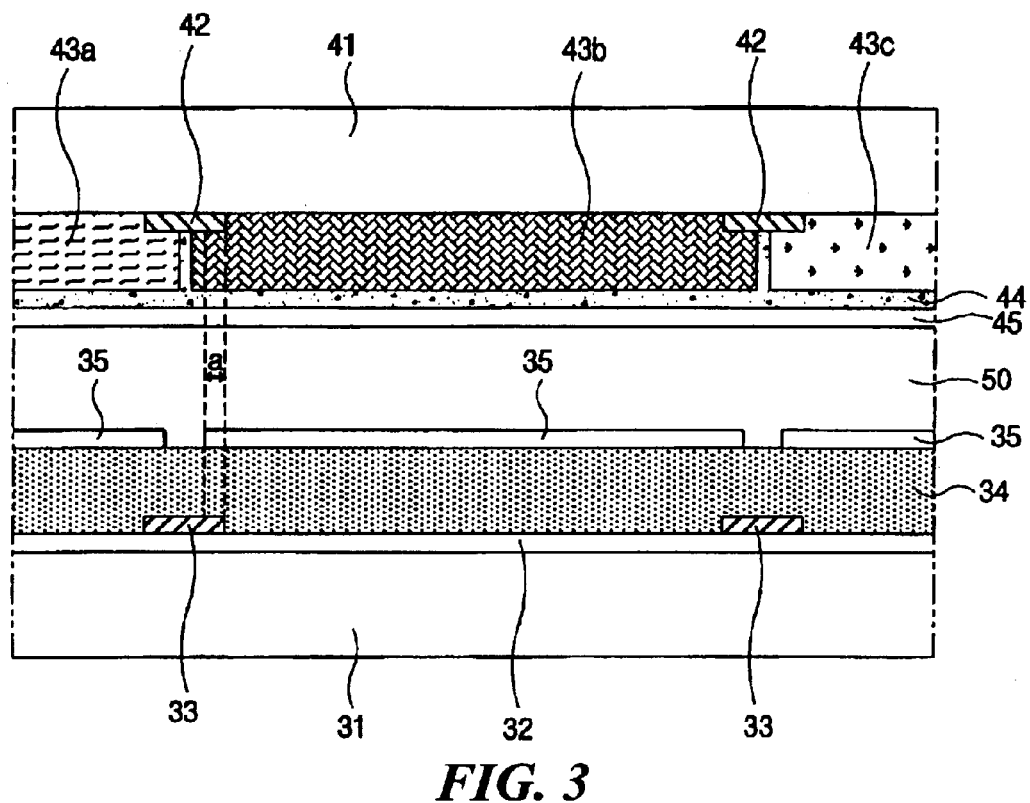
FIG. 3 is a cross-sectional view taken along line III—III of FIGS. 1 and 2, and illustrates both the array substrate and the color filter substrate according to the related art.
Figure 4:
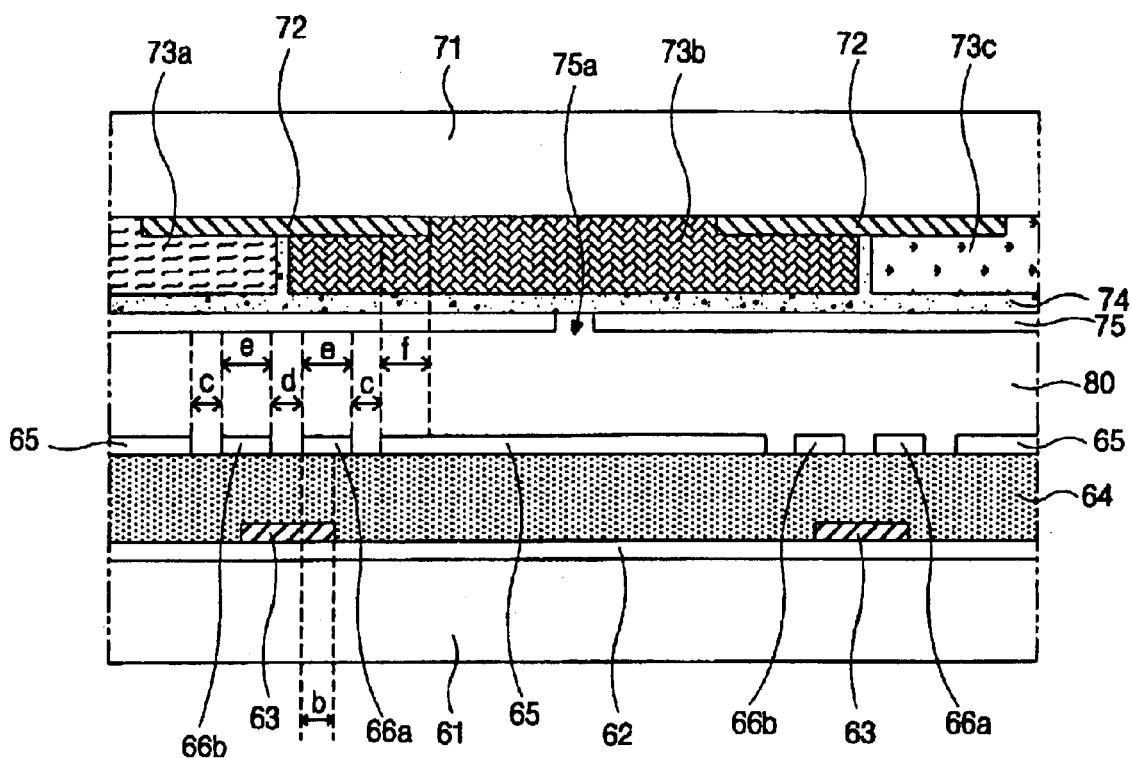
FIG. 4 is a cross-sectional view of an LCD device that adopts a multi-domain technology according to another related art.
Figure 5:
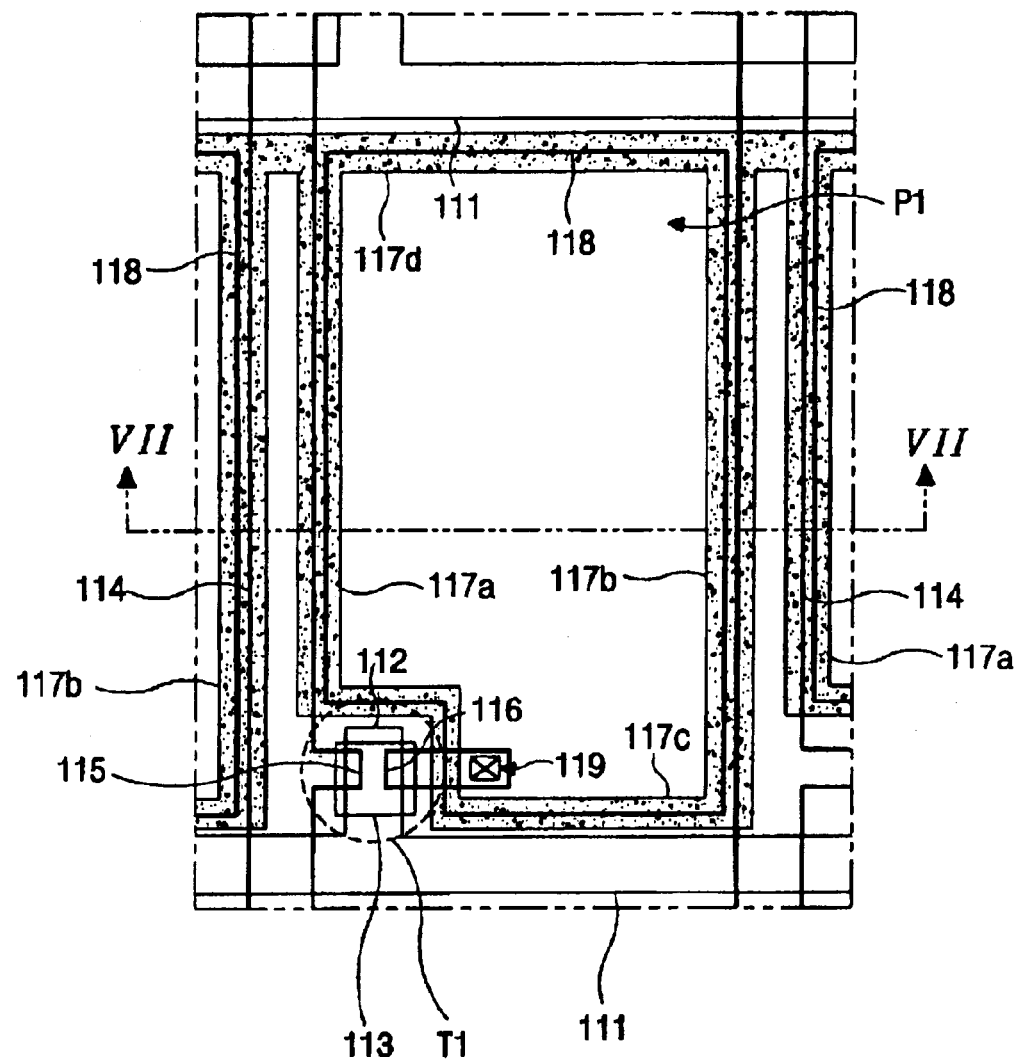
FIG. 5 is a partial plan view illustrating an array substrate of an LCD device according to the present invention.

FIG. 5 is a partial plan view illustrating an array substrate of an LCD device according to the present invention.

Figure 6:
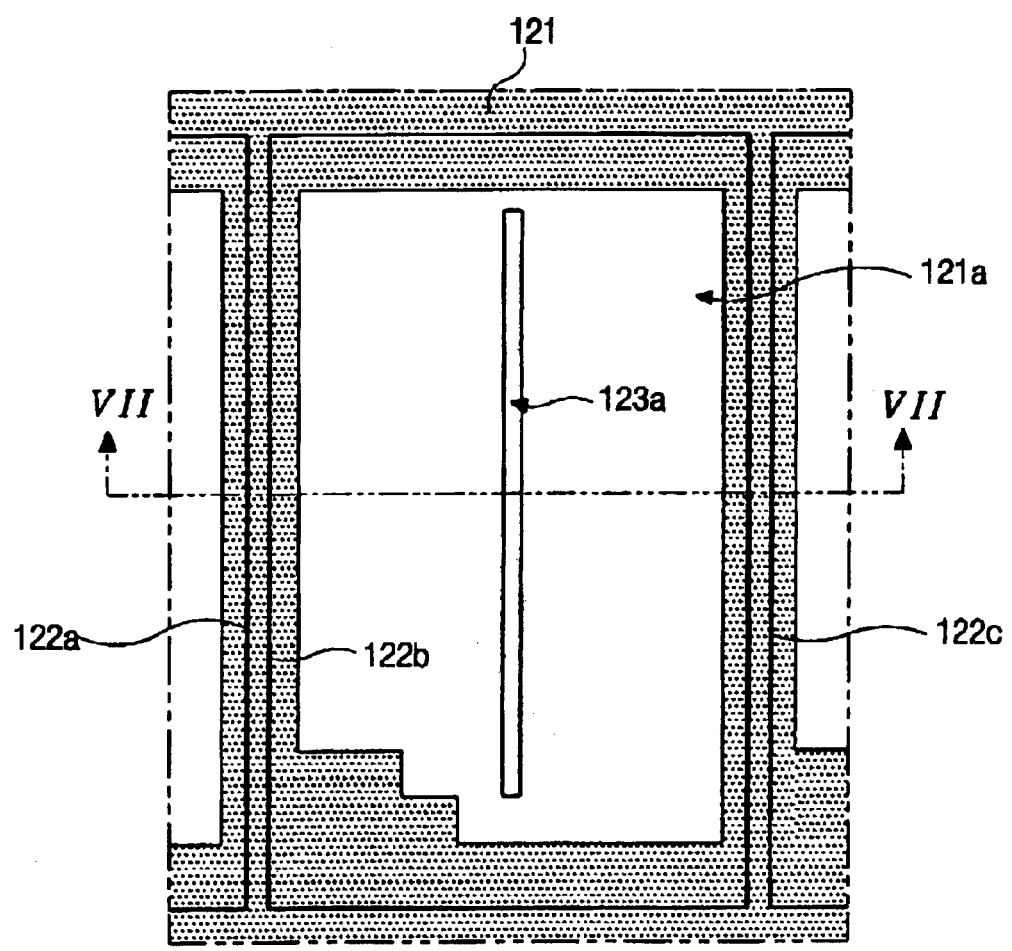
FIG. 6 is a partial plan view illustrating a color filter substrate of the LCD device according to the present invention.

FIG. 6 is a partial plan view illustrating a color filter substrate of the LCD device according to the present invention.

Referring to the array substrate of the inventive LCD device in FIG. 5, gate lines 111 are arranged in a horizontal direction and a gate electrode 112 extends from each gate line 111. The gate lines 111 and the gate electrode 112 are formed of the same material, such as metal. Data lines 114, which are a conductive metallic material, are then arranged in a longitudinal direction. The data lines 114 cross the gate lines 111 so as to define a pixel region P1. A source electrode 115 extends from each data line 114, and a drain electrode 116 is positioned opposite of the source electrode 115 across the gate electrode 112. The source and drain electrodes 115 and 116 overlap opposite ends of the gate electrode 112. A semiconductor layer 113 including an active layer of intrinsic semiconductor and an ohmic contact layer of extrinsic semiconductor is positioned over the gate electrode 112 and between the source electrode 115 and the drain electrode 116. Therefore, a thin film transistor T including the gate electrode 112, the semiconductor layer 113 and the source and drain electrodes 115 and 116 are positioned at a corner of the pixel region P1.

Still referring to FIG. 5, a pixel electrode 118 including a transparent conductive material, for example indium tin oxide, is formed in the pixel region P1. A portion of the pixel electrode 118 overlaps a portion of the drain electrode 116. The pixel electrode 118 is spaced apart from both the gate lines 111 and the data lines 114. A contact hole 119 is formed in the overlapping area of the drain and pixel electrodes 116 and 118. The pixel electrode 118 contacts the drain electrode 116 through the contact hole 119. Auxiliary electrodes 117a, 117b, 117c and 117d surround the pixel electrode 118 and overlap the peripheral portions of the pixel electrode 118. The auxiliary electrodes 117a, 117b, 117c and 117d are electrically connected to the neighboring auxiliary electrodes. Among the auxiliary electrodes 117a, 117b, 117c and 117d, the first and second auxiliary electrodes 117a and 117b, which are arranged in a longitudinal direction, also overlap the side portions of the data lines 114. The auxiliary electrodes 117a, 117b, 117c and 117d are made of an opaque conductive material, for example, aluminum (Al), aluminum (Al) alloy, titanium (Ti), copper (Cu), molybdenum (Mo) or the like, which have a relatively low resistivity.

Referring to the color filter substrate of the inventive LCD device in FIG. 6, a black matrix 121 has openings 121a each that correspond in position to the pixel electrode 118 of the array substrate of FIG. 5. Red, green and blue color filters 122a, 122b and 122c are formed on the black matrix 121 and alternately fill in the openings 121a. Each color filter 122a, 122b and 122c corresponds to the pixel region P1 of the array substrate of FIG. 5. Although not shown in FIG. 6, the color filter substrate includes a common electrode over all of the color filters 122a, 122b and 122c. The common electrode is formed of a transparent conductive material, and has a slit pattern 123a within a region for the opening 121a.

Figure 7:
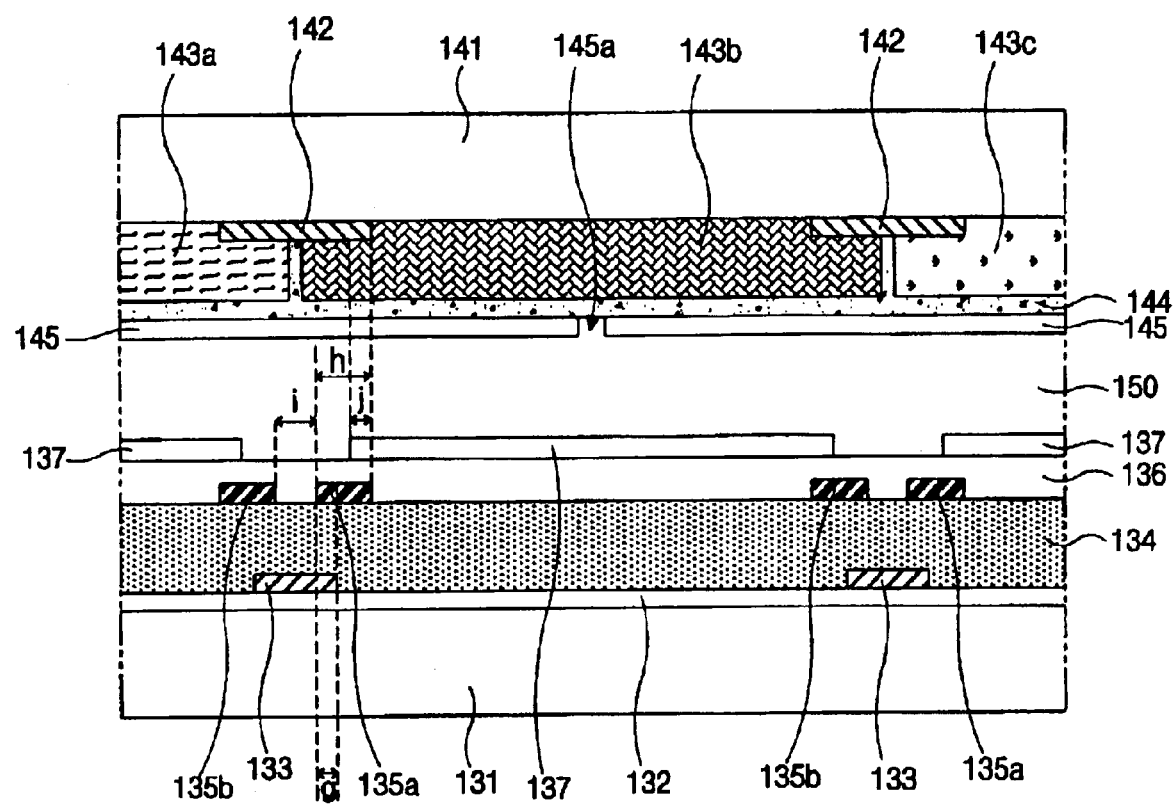
FIG. 7 is a cross-sectional view taken along line VII—VII of FIGS. 5 and 6, and illustrates both the array substrate and the color filter substrate according to a first embodiment of the present invention.

FIG. 7 is a cross-sectional view taken along line VII—VII of FIGS. 5 and 6, and illustrates both the array substrate and the color filter substrate according to a first embodiment of the present invention.

Referring to FIG. 7, a gate insulation layer 132 is formed on a first substrate 131. The gate insulation layer 132 is an inorganic substance, for example, silicon nitride or silicon oxide. Data lines 133 spaced apart from each other are formed on the gate insulation layer 132. As mentioned before, the data lines 133 cross the gate lines (not shown) that are disposed between the first substrate 131 and the gate insulation layer 132, and form the pixel regions with the gate lines (not shown). A first passivation layer 134 is formed on the gate insulation layer 132 while covering the data lines 133. The first passivation layer 134 is made of an organic material, for example, benzocyclobutene (BCB), which has a low dielectric constant. The first passivation layer 134 can also be formed of photo acryl. On the first passivation layer 134, auxiliary electrodes 135a and 135b that are made of a conductive material, for example, a metal, are formed. The auxiliary electrodes 135a and 135b overlap side portions of each data line 133. As mentioned with reference to FIG. 5, the auxiliary electrodes 135a and 135b surround the pixel region and are connected to the neighboring auxiliary electrodes. To prevent signal delay, it is recommended that the auxiliary electrodes 135a and 135 are formed of a metal having low resistivity, for example, aluminum (Al) or aluminum alloy. The overlapping width "g" of the data line 133 and each auxiliary electrode 135a or 135b is less than approximately 3 micrometers ($\mu$m) to prevent signal interference between the data line 133 and the auxiliary electrodes 135a and 135b. The width "h" of each auxiliary electrode 135a or 135b ranges from approximately 7 to 8 micrometers ($\mu$m), and the distance "i" between two adjacent auxiliary electrodes 135a and 135b is less than approximately 4 micrometers ($\mu$m) in order to prevent a short-circuit therebetween. A second passivation layer 136 is formed on the first passivation layer 134 and on the auxiliary electrodes 135a and 135b. The second passivation layer 136 is an inorganic material, for example, silicon nitride or silicon oxide. Pixel electrodes 137 are formed on the second passivation layer 136, and each pixel electrode 137 overlaps portions of the auxiliary electrodes 135a and 135b that are on both the right and left sides. For an improved fringe field, the overlapping portion "j" of the pixel electrode 137 and each auxiliary electrode 135a or 135b is recommended to be less than approximately 4 micrometers ($\mu$m), beneficially about 3 micrometers ($\mu$m). In the present invention, the pixel electrodes 137 are made of a transparent conductive material, for example, indium tin oxide (ITO). Additionally, the overlapping area of the pixel electrode 137 and the auxiliary electrodes 135a and 135b makes up a storage capacitor in each pixel.

Still referring to FIG. 7, a second substrate 141 is positioned above the first substrate 131. On the rear surface of the second substrate 141, a black matrix 142 is formed. As described with reference to FIG. 6, the black matrix 142 has openings therein each corresponding in position to each pixel electrode 137. The black matrix 142 covers the peripheries of the pixel electrodes 137 in order to prevent light leakage in regions except the pixel electrode regions.

Figure 12:
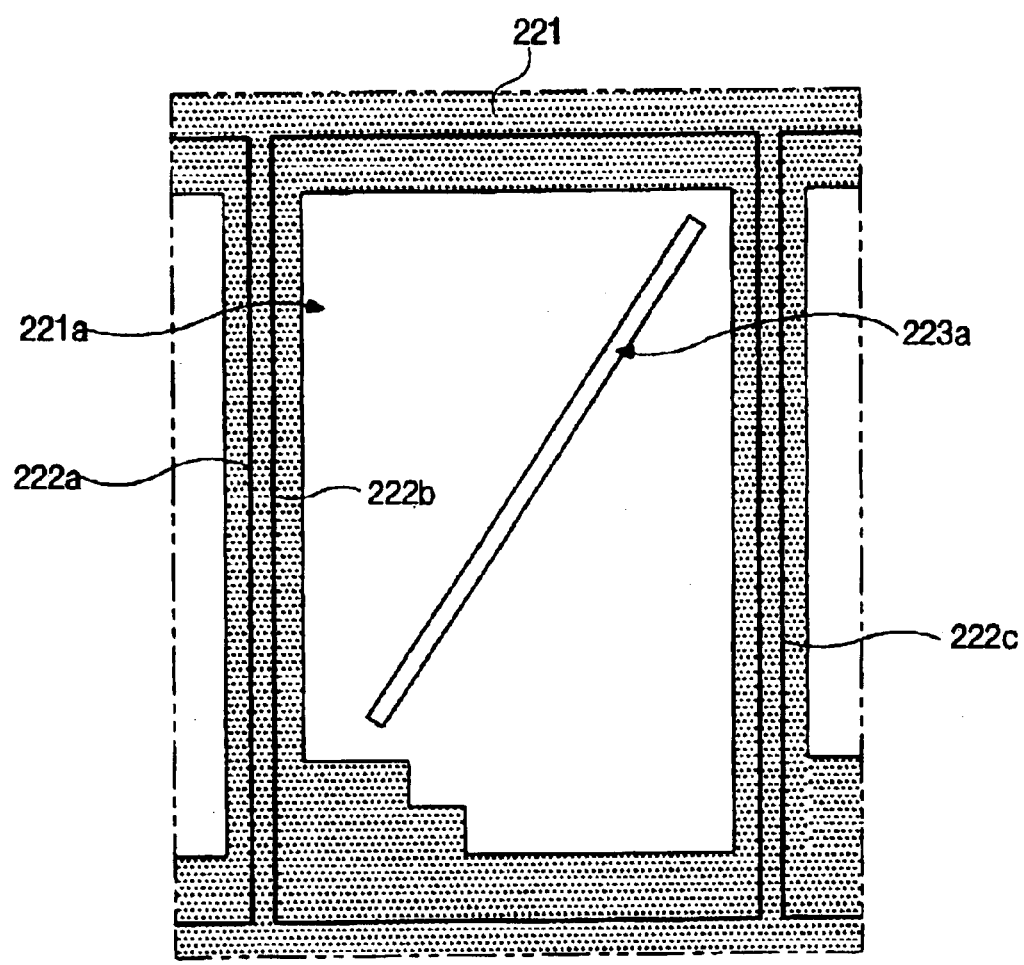
FIGS. 12 and 13 are partial plan views each illustrating another exemplary color filter substrate of the LCD device according to the present invention.
Figure 13:
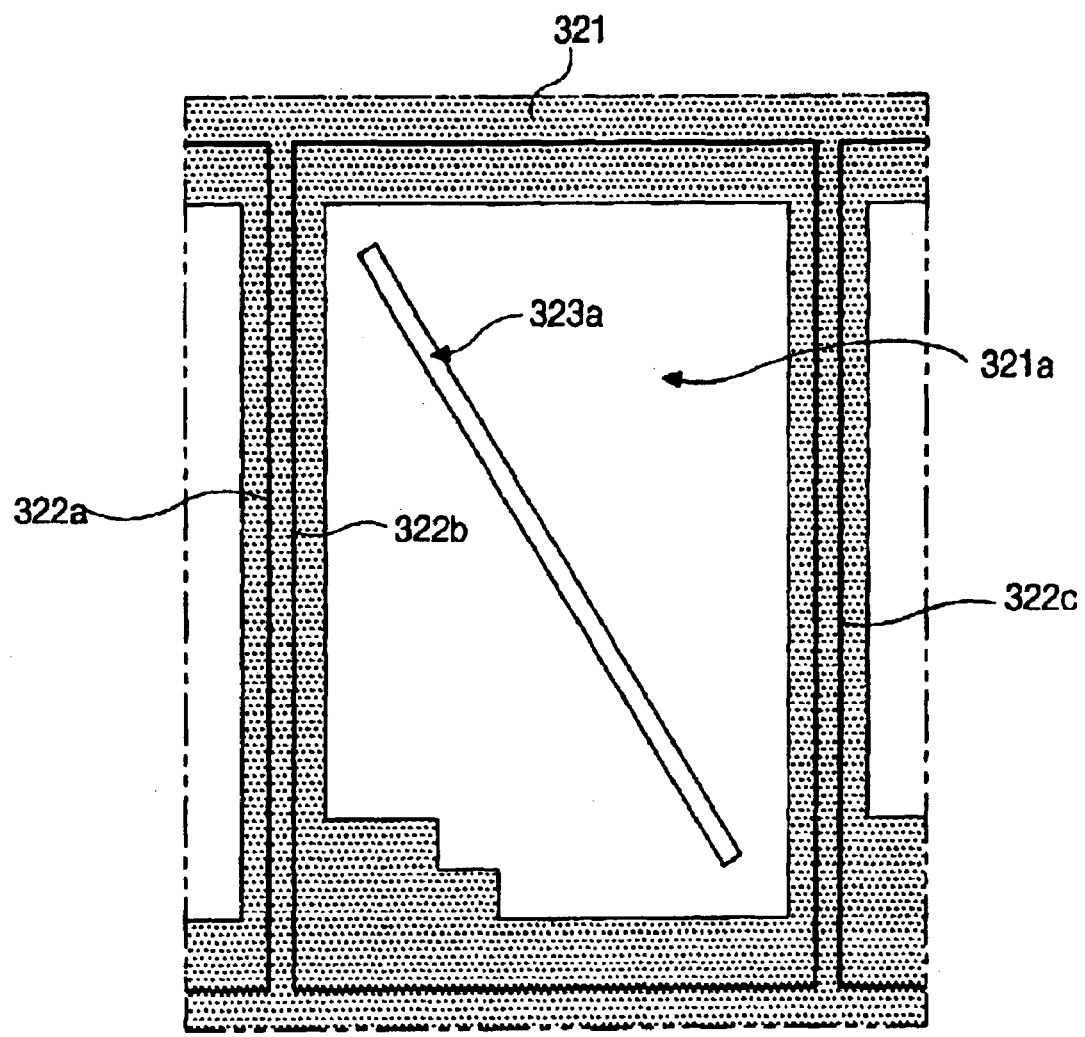

In the present invention, since the auxiliary electrodes 135a and 135b are formed of an opaque material, light leakage occurring around the pixel electrodes 137 is prevented. Therefore, the overlapping width of the black matrix 142 covering the peripheries of the pixel electrodes can be the same as the overlapping portion "j" of the pixel electrode and the auxiliary electrodes. Furthermore, the overlapping width of the black matrix 142 covering the peripheries of the pixel electrode can be less than the overlapping portion "j". Red, green and blue color filters 143a, 143b and 143c are also formed, alternately, on the rear surface of the second substrate 141. The color filters 143a, 143b and 143c also cover portions of the black matrix 42 and fill in the openings of the black matrix 142. Each of the color filters 143a, 143b and 143c corresponds to each pixel electrode 135. An overcoat layer 144 covers the color filters 143a, 143b and 143c to protect the color filters 143a, 143b and 143c from possible damages. The overcoat layer 144 can also act to planarize the rear surface of the color filter substrate. The overcoat layer 144 can be omitted in the present invention. A common electrode 145 is formed on the rear surface of the overcoat layer 144. Additionally, the common electrode 145 has a slit pattern 145a in a position corresponding to the pixel electrode 137. The slit pattern 145a has an I-shape like the slit pattern 123a of FIG. 6 or a diagonal-shape as shown in FIGS. 12 and 13. A liquid crystal layer 150 is interposed into an interval between the common electrode 145 and the pixel electrodes 137. Although not shown in FIG. 7, alignment layers are positioned on the pixel electrodes 137 and on the common electrode 145, respectively, so as to determine the initial alignment direction of the liquid crystals.

Generally in the fringe-field multi-domain LCD device adopting the slit pattern in the common electrode, the dielectric anisotropy of the liquid crystals is negative and thus the liquid crystals have a vertical alignment mode. In the present invention, the liquid crystal display uses twisted nematic liquid crystals.

As described with reference FIGS. 5 to 7, the LCD device of the present invention can have two domains without an additional rubbing process to align the liquid crystals in different directions, thus improving the viewing angle. Furthermore, the first passivation layer is an organic material, the auxiliary electrodes of the opaque metallic material overlap the data lines, and the pixel electrodes overlap the auxiliary electrodes. Since the opaque auxiliary electrodes are formed in a different plane from the pixel electrodes, the sizes of pixel electrodes can increase. Further, since the auxiliary electrodes prevent light leakage around each pixel electrode, the black matrix can decrease in size. Accordingly, the aperture ratio is improved.

Figure 8A:
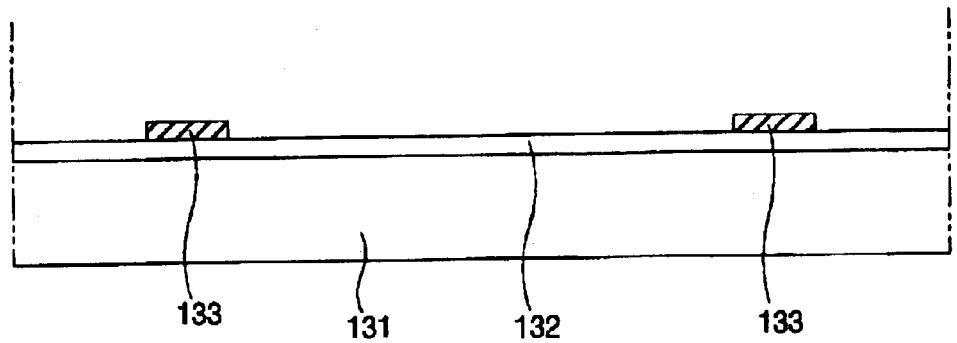
FIGS. 8A to 8C are cross-sectional views illustrating the steps of forming the array substrate of FIG. 7 according to the present invention.
Figure 8B:
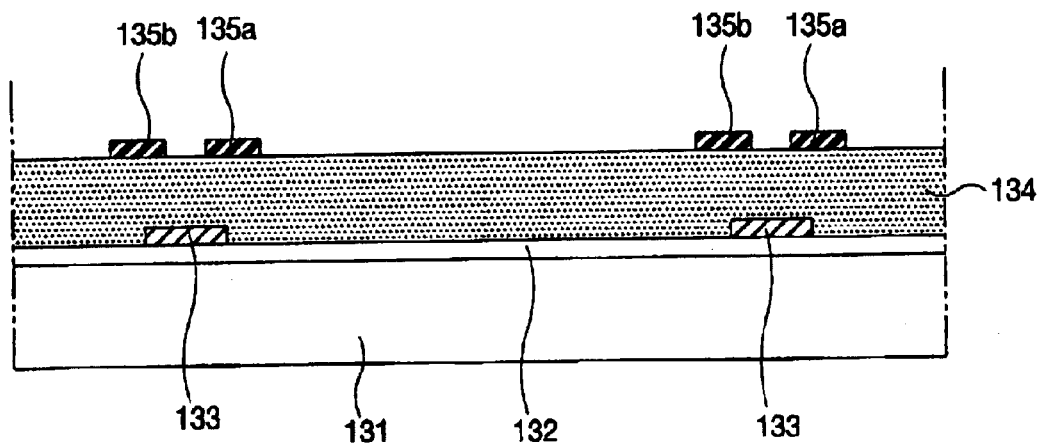
Figure 8C:
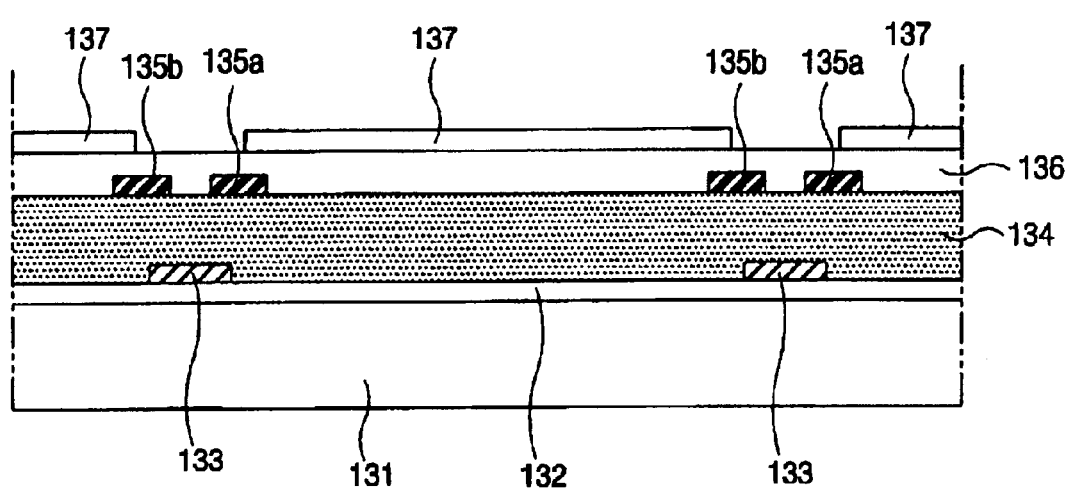

FIGS. 8A to 8C are cross-sectional views illustrating the steps of forming the array substrate of FIG. 7 according to the present invention.

Referring to FIG. 8A, the gate insulation layer 132 is formed on the first substrate 131 by depositing silicon nitride or silicon oxide. A conductive material, for example, a metal, is then deposited and patterned to form the data lines 133 on the gate insulation layer 132. Although not shown in FIG. 8A, the gate lines and the gate electrodes are formed between the first substrate 131 and the gate insulation layer 132. Also, before forming the data lines 133, a semiconductor layer (see reference 113 of FIG. 5) including an active layer (not shown) and an ohmic contact layer (not shown) is formed on the gate insulation layer. When forming the data lines 133, source and drain electrodes (see references 115 and 116 of FIG. 5) are formed on the ohmic contact layer (not shown). The data lines 133 define the pixel regions with the gate lines.

Next in FIG. 8B, an organic material, for example, benzocyclobutene (BCB), is applied on the gate insulation layer 132 to form the first passivation layer 134 covering the data lines 133. Thereafter, aluminum (Al) or aluminum alloy is deposited on the first passivation layer and then patterned to form the auxiliary electrodes 135a and 135b. As described before, the auxiliary electrodes 135a and 135b overlap portions of the data lines 133. The auxiliary electrodes 135a and 135b have a formation surrounding the pixel electrodes 137 (in FIGS. 5 and 8C) when viewed from a superficial observation.

In FIG. 8C, silicon nitride or silicon oxide is formed on the first passivation layer 134 and on the auxiliary electrodes 135a and 135b so as to form the second passivation layer 136. On the second passivation layer 136, a transparent conductive material, for example, indium tin oxide, is deposited and then patterned to form the pixel electrodes 137. Each pixel electrodes 137 overlaps the peripheral portions of the auxiliary electrodes 135a and 135b.

Figure 9A:
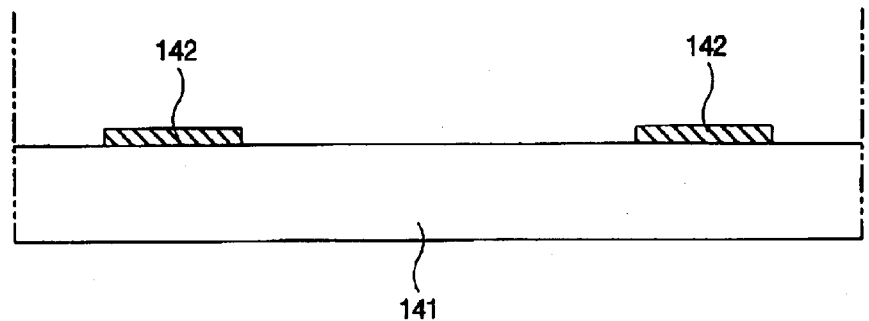
FIGS. 9A to 9C are cross-sectional views illustrating the steps of forming the color filter substrate of FIG. 7 according to the present invention.
Figure 9B:
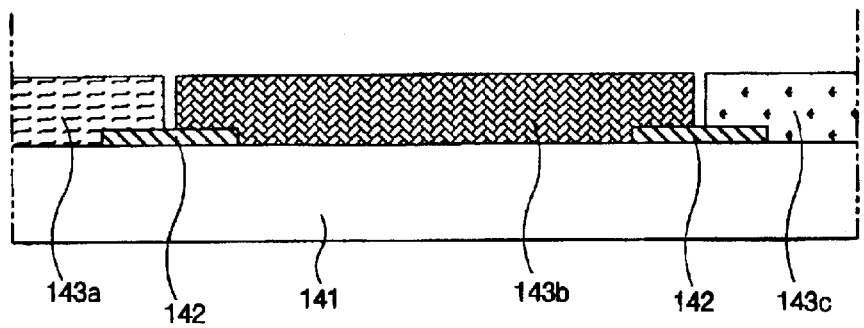
Figure 9C:
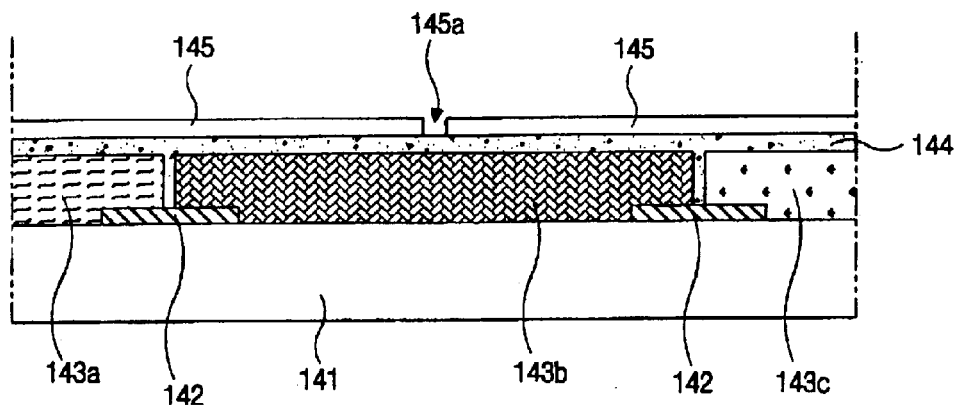

FIGS. 9A to 9C are cross-sectional views illustrating the steps of forming the color filter substrate of FIG. 7 according to the present invention.

Referring to FIG. 9A, the black matrix 142 is formed on the second substrate 141 that may be a transparent glass substrate. The black matrix 142 can be formed by depositing and patterning a metal, for example, chromium (Cr), or using a black resin.

In FIG. 9B, the red, green and blue color filters 143a, 143b and 143c are alternately formed on the black matrix 142 and on the second substrate 141. Among the various method of forming the color filters 143a, 143b and 143c, a pigment dispersion method, a staining method or a printing method can be adopted in the present invention.

In FIG. 9C, the overcoat layer 144 is formed on the color filters 143a, 143b and 143c planarizing the front surface of the color filter substrate. A transparent conductive material, for example, indium tin oxide (ITO), is formed on the overcoat layer 144 to form a common electrode 145. After pattering the common electrode 145, the slit pattern 145a is formed to expose a portion of the overcoat layer 144. The slit pattern 145a corresponds to each of the color filters 143a, 143b and 143c.

After completing the array substrate of FIG. 8C and the color filter substrate of FIG. 9C, these array and color filter substrates are aligned and attached to each other. Thereafter, the liquid crystals are injected between the array substrate and the color filter substrate, thereby completing the LCD device of FIG. 7. Instead of injecting the liquid crystals, a dispensing method that drops the liquid crystals on one of the array and color filter substrates can be used before aligning and attaching the array and color filter substrates.

In the first embodiment of the present invention described with reference to FIG. 7, the liquid crystals underneath the slit pattern 145a can be misaligned when an electric field is applied to the liquid crystal layer 150. This misalignment of the liquid crystals underneath the slit pattern 145a may cause light leakage. Thus, another embodiment is presented as illustrated in FIG. 10.

Figure 10:
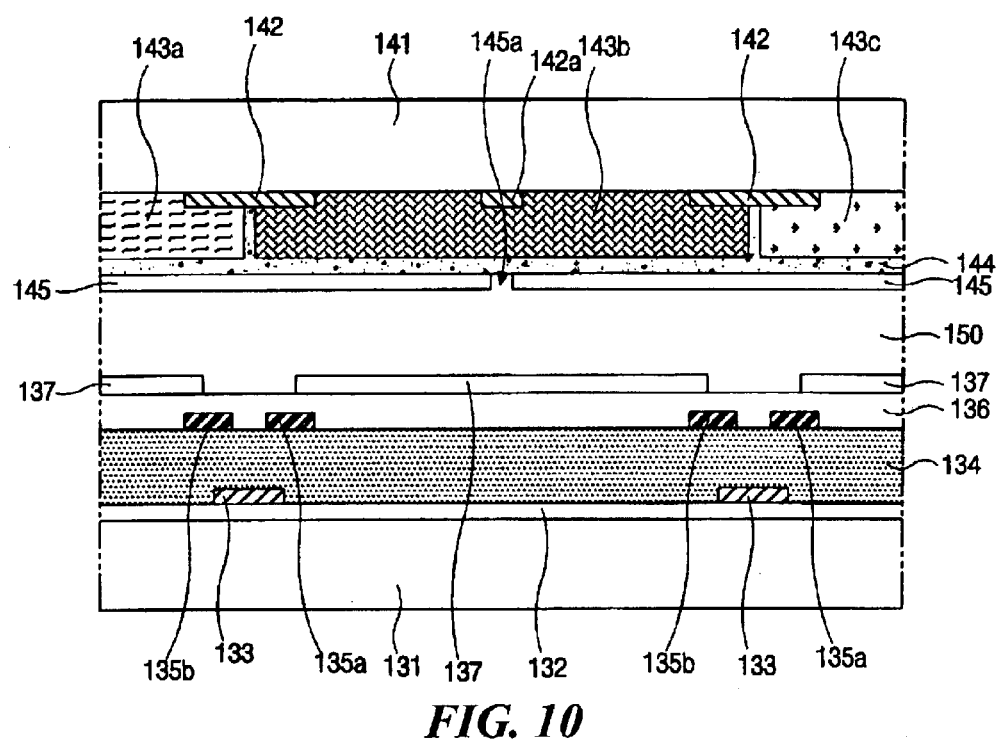
FIG. 10 is a cross-sectional view taken along line VII—VII of FIGS. 5 and 6, and illustrates both the array substrate and the color filter substrate according to a second embodiment of the present invention.

FIG. 10 is a cross-sectional view taken along line VII—VII of FIGS. 5 and 6, and illustrates both the array substrate and the color filter substrate according to a second embodiment of the present invention. Since the second embodiment of FIG. 10 has a structure and configuration similar to the first embodiment of FIG. 7, the same reference numbers will be used in the second embodiment of FIG. 10 to refer to the same parts and the detailed explanations mentioned with reference to FIG. 7 will be omitted.

In FIG. 10 illustrating the second embodiment, the color filter substrate includes a black matrix pattern 142a on the rear surface of the second substrate 141 in the position corresponding to the slit pattern 145a. The black matrix pattern 142a is approximately the same size as the slit pattern 145a, or slightly larger than the slit pattern 145a.

When voltage is applied to the pixel electrodes 137 and the common electrode 145 in the second embodiment of FIG. 10, a fringe field is produced between the pixel electrodes 137 and the common electrode 145 because the common electrode 145 has a slit pattern 145a. Thus, the liquid crystals are arranged in two different directions with respect to the slit pattern 145a, and form multi domains. At this time, the liquid crystals positioned underneath the slit pattern 145a form a neutral area or a boundary because these liquid crystals are not properly arranged, unlike the liquid crystals in the domain areas. Thus, a disclination of liquid crystals is created underneath the slit pattern 145a. However, since the LCD device of the second embodiment has a black matrix pattern 142a corresponding in position to the slit pattern 145a, the disclination of the liquid crystals is prevented and then the luminance of the LCD device can be increased. In the present invention, the black matrix pattern 142a is formed with the black matrix 142 using the same material. Alternatively, the black matrix pattern 142a can be formed with the data lines 133 over the first substrate 132 in a position corresponding to the slit pattern 145a.

Meanwhile, in the first and second embodiments of the present invention, since the organic passivation layer 134 is formed on the data lines 133, the organic passivation layer 134 contacts channel regions of the thin film transistors (TFTs). When the organic passivation layer 134 formed of the organic material contacts the channel regions, the characteristics of thin film transistors are deteriorated. Thus, another embodiment is presented as illustrated in FIG. 11.

Figure 11:
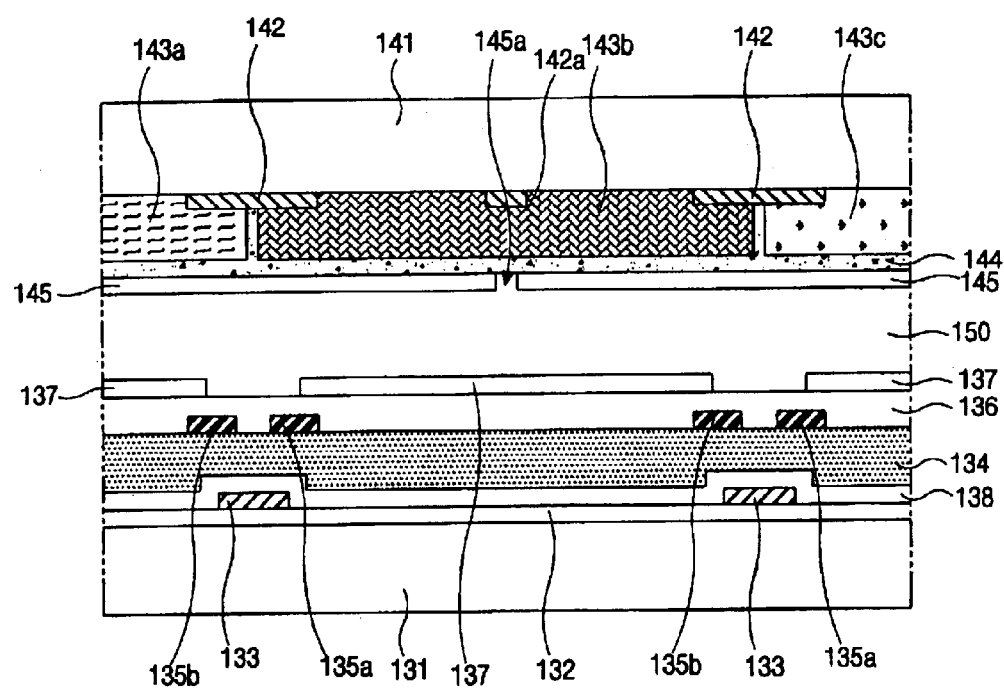
FIG. 11 is a cross-sectional view taken along line VII—VII of FIGS. 5 and 6, and illustrates both the array substrate and the color filter substrate according to a third embodiment of the present invention.

FIG. 11 is a cross-sectional view taken along line VII—VII of FIGS. 5 and 6, and illustrates both the array substrate and the color filter substrate according to a third embodiment of the present invention. Since the third embodiment of FIG. 11 has a structure and configuration similar to the first and second embodiments, the same reference numbers will be used in the third embodiment of FIG. 11 to refer to the same parts and the detailed explanations mentioned with reference to FIGS. 7 and 10 will also be omitted.

Referring to FIG. 11, an additional inorganic layer 138 is interposed between the gate insulation layer 132 and the first passivation layer 134. The additional inorganic layer 138 is formed of silicon nitride or silicon oxide. The additional inorganic layer 138 covers the data lines 133 and the thin film transistors (not shown) connected to the data lines 133. Thus, the additional inorganic layer 138 adequately covers the channel regions of the thin film transistors, and the first passivation layer 134 of organic material is on the additional inorganic layer 138. Since the channel regions of the thin film transistors are protected from the first passivation layer 134 of organic material, the characteristics of the thin film transistors are not deteriorated and decreased. Furthermore, the LCD device of the third embodiment includes the black matrix pattern 145a on the rear surface of the second substrate 141 like the second embodiment. The black matrix pattern 145 can be formed on the gate insulation layer corresponding in position to the slit pattern 145a when forming the data lines 133. Accordingly, the LCD device of the third embodiment has an improved viewing angle, a high aperture ratio and no characteristic-deterioration of thin film transistors.

Moreover, the slit pattern 145a in the first to third embodiments has an "I"-shape that is parallel with the data line as shown in FIG. 6. However, various shapes are possible, for example, a horizontally straight shape, an "X"-shape, a cross shape, a diagonal shape and the like may be used.

FIGS. 12 and 13 are partial plan views each illustrating another exemplary color filter substrate of the LCD device according to the present invention.

As shown FIG. 12, the color filter substrate is similar to that of FIG. 6. A black matrix 221 has openings 221a each that correspond in position to the pixel electrode of the array substrate. Red, green and blue color filters 222a, 222b and 222c are formed on the black matrix 221 and alternately fill in the openings 221a. Each color filter 222a, 222b and 222c corresponds to the pixel region of the array substrate. Although not shown in FIG. 12, the color filter substrate includes a common electrode over all of the color filters 222a, 222b and 222c, and has a slit pattern 223a within the region for the opening 221a. In the color filter substrate of FIG. 12, the slit pattern 223a has a slash or diagonal shape that stretches from right top to left bottom. The slit pattern 223a also forms a fringe field for the multi-domain pixel.

The color filter substrate of FIG. 13 has a similar shape to that of FIG. 12, but a different slit pattern. A black matrix 321 has openings 321a each that correspond in position to the pixel electrode of the array substrate. Red, green and blue color filters 322a, 322b and 322c are formed on the black matrix 321, and alternately fill in the openings 321a. Each color filter 322a, 322b and 322c corresponds to the pixel region of the array substrate. Although not shown in FIG. 13, the color filter substrate includes a common electrode over all of the color filters 322a, 322b and 322c, and has a slit pattern 323a within the region for the opening 321a. In the color filter substrate of FIG. 13, the slit pattern 323a also has a slash or diagonal shape. However, the slit pattern 323a stretches from the left top to the right bottom. The slit pattern 323a also forms a multi-domain pixel by inducing a fringe field in the LCD device.

According to the present invention described herein, the common electrode has a slit pattern so as to form a fringe field between the common electrode and the pixel electrode. Thus, the LCD device can have an improved viewing angle. Furthermore, since the auxiliary electrodes are formed on the organic passivation layer to intensify the fringe field and overlap the data lines and the pixel electrode overlaps the auxiliary electrodes, the size of the black matrix can be reduced and the aperture ratio can increase. Additionally, since the black matrix pattern is formed corresponding in position to the slit pattern, light leakage is prevented in the portion for slit pattern and the luminance of LCD device is increased. Furthermore, since an additional inorganic layer is formed between the organic passivation layer and the thin film transistors, the channel regions of the thin film transistors are protected and the characteristics of the thin film transistors are not deteriorated.

It will be apparent to those skilled in the art that various modifications and variations can be made in the array substrate of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

first and second substrates;

gate and data lines over the first substrate, defining a pixel region by crossing each other;

a thin film transistor at a crossing of the gate and data lines;

a first passivation layer over the gate and data lines and over the thin film transistor;

an auxiliary electrode on the first passivation layer, wherein the auxiliary electrode partially overlaps a side portion of the data line by a distance of less than about 3 μm and is electrically connected to a neighboring auxiliary electrode;

a second passivation layer on the auxiliary electrode;

a pixel electrode on the second passivation layer connected to the thin film transistor;

a common electrode on the second substrate; and a liquid crystal layer between the first and second substrates.

2. The device of claim 1, further comprising:

a black matrix on the second substrate; and a color filter on the black matrix.

3. The device of claim 2, further comprising an overcoat layer on the color filter.

4. The device of claim 1, wherein the auxiliary electrode is an opaque conductive material.

5. The device of claim 4, wherein the opaque conductive material includes one of aluminum and aluminum alloy.

6. The device of claim 1, wherein the first passivation layer is an organic material.

7. The device of claim 6, wherein the organic material includes one of benzocyclobutene and photo acryl.

8. The device of claim 1, wherein the second passivation layer is an inorganic material.

9. The device of claim 8, wherein the inorganic material includes one of silicon nitride and silicon oxide.

10. The device of claim 1, wherein the common electrode includes a slit pattern.

11. The device of claim 10, wherein the slit pattern has an "I"-shape when viewed from a superficial observation.

12. The device of claim 10, wherein the slit pattern has a diagonal shape when viewed from a superficial observation.

13. The device of claim 10, further comprising a black matrix pattern between the second substrate and the color filter, the black matrix pattern corresponding to the slit pattern.

14. The device of claim 1, further comprising: a gate insulation layer on the first substrate; and an additional inorganic layer between the first passivation layer and the gate insulation layer.

15. The device of claim 14, wherein the additional inorganic layer includes one of silicon nitride and silicon oxide.

16. The device of claim 1, wherein the pixel electrode overlaps portions of the auxiliary electrode to form a storage capacitor.

17. A method of fabricating a liquid crystal display device, comprising:

forming gate and data lines over a first substrate, the gate and data lines defining a pixel region by crossing each other;

forming a thin film transistor at a crossing of the gate and data lines;

forming a first passivation layer over the gate and data lines and over the thin film transistor;

forming an auxiliary electrode on the first passivation layer, wherein the auxiliary electrode partially overlaps a side portion of the data line by a distance of less than about 3 μm and is electrically connected to a neighboring auxiliary electrode;

forming a second passivation layer on the auxiliary electrode;

forming a pixel electrode on the second passivation layer connected to the thin film transistor;

forming a common electrode over a second substrate;

attaching the second substrate having the common electrode to the first substrate having the pixel electrodes so as to allow the common electrode to face the pixel electrodes; and interposing liquid crystals between the common electrode and the pixel electrode.

18. The method of claim 17, further comprising:

forming a black matrix on the second substrate; and forming a color filter on the black matrix.

19. The method of claim 18, further comprising forming an overcoat layer on the color filter.

20. The method of claim 17, wherein the auxiliary electrode is formed of an opaque conductive material.

21. The method of claim 20, wherein the opaque conductive material includes one of aluminum and aluminum alloy.

22. The method of claim 17, wherein the first passivation layer is formed of an organic material.

23. The method of claim 22, wherein the organic material includes one of benzocyclobutene and photo acryl.

24. The method of claim 17, wherein the second passivation layer is formed of an inorganic material.

25. The method of claim 24, wherein the inorganic material includes one of silicon nitride and silicon oxide.

26. The method of claim 17, wherein forming the common electrode includes forming a slit pattern.

27. The method of claim 26, wherein the slit pattern has an "I"-shape when viewed from a superficial observation.

28. The method of claim 26, wherein the slit pattern has a diagonal shape when viewed from a superficial observation.

29. The method of claim 26, further comprising forming a black matrix pattern between the second substrate and the color filter, the black matrix pattern corresponding to the slit pattern.

30. The method of claim 17, further comprising:

forming a gate insulation layer on the first substrate; and forming an additional inorganic layer between the first passivation layer and the gate insulation layer.

31. The method of claim 30, wherein the additional inorganic layer includes one of silicon nitride and silicon oxide.

32. The method of claim 17, wherein the pixel electrode overlaps portions of the auxiliary electrode to form a storage capacitor.

* * * * *